United States Patent
Dyksterhouse (10) Patent No.: US 6,709,995 B1
(45) Date of Patent: Mar. 23, 2004

(54) METHOD OF PREPREGGING WITH RESIN AND NOVEL PREPREGS PRODUCED BY SUCH METHOD

(76) Inventor: Joel A. Dyksterhouse, 925 Grove St., Petoskey, MI (US) 49770

( * ) Notice: Subject to any disclaimer, the term of this patent is extended or adjusted under 35 U.S.C. 154(b) by 0 days.

(21) Appl. No.: 09/700,950

(22) PCT Filed: Jul. 8, 1998

(86) PCT No.: PCT/US98/14122
§ 371 (c)(1),
(2), (4) Date: Nov. 20, 2000

(87) PCT Pub. No.: WO99/02319
PCT Pub. Date: Jan. 21, 1999

Related U.S. Application Data (63) Continuation-in-part of application No. 08/890,574, filed on Jul. 9, 1997, now Pat. No. 5,911,932.

(51) Int. Cl.[7] .......................... B29B 15/12; B29C 39/18; D04H 3/08
(52) U.S. Cl. .......................... 442/330; 425/93; 425/445; 442/331; 442/333; 442/366; 442/367
(58) Field of Search ................................ 264/103, 129, 264/131, 136, 137, 140, 171.13; 425/93, 445; 442/330, 331, 333, 366, 367

(56) References Cited

U.S. PATENT DOCUMENTS

| 924,555 A | 6/1909 | Jenkins |
|---|---|---|
| 1,179,660 A | 4/1916 | Sanders |
| 1,590,602 A | 6/1926 | Taylor |
| 1,808,590 A | 6/1931 | Andernach |
| 2,204,664 A | 6/1940 | Clark |
| 2,324,645 A | 7/1943 | Prehler |
| 2,452,761 A | 11/1948 | Jesionowski |
| 2,871,911 A | 2/1959 | Goldsworthy et al. |
| 3,000,464 A | 9/1961 | Watters |
| 3,273,987 A | 9/1966 | Marzocchi et al. |
| 3,826,703 A | 7/1974 | Russell |
| 3,829,545 A | 8/1974 | Van Vlaenderen |
| 3,839,072 A | 10/1974 | Kearsey |
| 3,993,726 A | 11/1976 | Moyer |
| 4,000,237 A | 12/1976 | Roberts, Jr. |
| 4,151,238 A | 4/1979 | Ziemek et al. |
| 4,168,194 A | 9/1979 | Stiles |
| 4,541,884 A | 9/1985 | Cogswell et al. |
| 4,549,920 A | 10/1985 | Cogswell et al. |
| 4,559,262 A | 12/1985 | Cogswell et al. |
| 4,624,886 A | 11/1986 | Cogswell et al. |
| 4,690,836 A | * 9/1987 | Clarke et al. ............... 427/299 |
| 4,735,828 A | 4/1988 | Cogswell et al. |
| 4,783,349 A | 11/1988 | Cogswell et al. |
| 4,894,105 A | 1/1990 | Dyksterhouse et al. |
| 4,917,847 A | 4/1990 | Solomon |
| 4,976,906 A | 12/1990 | Nakasone et al. |

(List continued on next page.)

FOREIGN PATENT DOCUMENTS

| EP | 0 167 303 A1 | 1/1986 |
|---|---|---|
| EP | 0 393 536 A2 | 10/1990 |
| WO | WO 95/25000 A1 | 9/1995 |

OTHER PUBLICATIONS

Gibson, A.G., et al. "Impregnation Technology for Thermoplastic Matrix Composites," Composites Manufacturing, vol. 3, No. 4, 1992, pp. 223–233.

Primary Examiner—Leo B. Tentoni
(74) Attorney, Agent, or Firm—Harness, Dickey & Pierce, P.L.C.

(57) ABSTRACT

Disclosed is a process of forming a prepreg material having substantially no voids. According to the process of the invention, the reinforcing material is heated to a temperature above the temperature of the impregnating resin. The prepreg formed has substantially no voids and does not require lengthy consolidation when formed into useful articles.

21 Claims, 3 Drawing Sheets

U.S. PATENT DOCUMENTS

| | | |
|---|---|---|
| 4,990,207 A | 2/1991 | Sakai et al. |
| 5,019,450 A | 5/1991 | Cogswell et al. |
| 5,080,851 A | 1/1992 | Flonc et al. |
| 5,145,615 A | 9/1992 | Kim et al. |
| 5,196,152 A | 3/1993 | Gamache et al. |
| 5,213,889 A | 5/1993 | Cogswell et al. |
| 5,236,646 A | 8/1993 | Cochran et al. |
| 5,268,136 A | 12/1993 | Girad et al. |
| 5,273,781 A | 12/1993 | Shu |
| 5,424,388 A | 6/1995 | Chen et al. |
| 5,482,667 A | 1/1996 | Dunton et al. |
| 5,540,797 A | 7/1996 | Wilson |
| 5,571,356 A | 11/1996 | Skaletz et al. |
| 5,609,806 A | 3/1997 | Walsh et al. |

\* cited by examiner

FIG. 2.

METHOD OF PREPREGGING WITH RESIN AND NOVEL PREPREGS PRODUCED BY SUCH METHOD

CROSS-REFERENCE TO RELATED APPLICATIONS

This application is a national stage application under 35 U.S.C. §371 of PCT/US98/14122, filed Jul. 8, 1998, which is a continuation-in-part of United States patent application Ser. No. 08/890,574 filed on Jul. 9, 1997, now U.S. Pat. No. 5,911,932, issued Jul. 15, 1999.

FIELD OF THE INVENTION

The invention concerns fiber reinforced compositions and articles and methods for producing such compositions and articles.

In particular, the present invention provides an apparatus and a method of prepregging reinforcing materials such as fibers with resinous or polymeric materials, especially with thermoplastic resin or polymer compositions, and the prepregs produced by such apparatus or method. The invention further provides a method of using such prepregs to form articles having highly desirable properties and to the articles produced thereby.

BACKGROUND AND SUMMARY OF THE INVENTION

Reinforced thermoplastic and thermoset materials have wide application in, for example, the aerospace, automotive, industrial/chemical, and sporting goods industries. Thermosetting resins are impregnated into the reinforcing material before curing, while the resinous materials are low in viscosity. Thermoplastic compositions, in contrast, are more difficult to impregnate into the reinforcing material because of comparatively higher viscosities. On the other hand, thermoplastic compositions offer a number of benefits over thermosetting compositions. For example, thermoplastic prepregs are easier to fabricate into articles. Another advantage is that thermoplastic articles formed from such prepregs may be recycled. In addition, a wide variety of properties may be achieved by proper selection of the thermoplastic matrix.

Fiber-reinforced plastic materials may be manufactured by first impregnating the fiber reinforcement with resin to form a prepreg, then consolidating two or more prepregs into a laminate, optionally with additional forming steps. Consolidation is typically necessary to remove voids that result from the inability of the resin to fully displace air from the fiber bundle, tow, or roving during the processes that have been used to impregnate the fibers with resin. The individually impregnated roving yarns, tows, plies, or layers of prepregs are usually consolidated by heat and pressure, or with heat and vacuum as by vacuums molding and compacting in an autoclave. The consolidation step has generally required the application of very high pressures or vacuums at high temperatures and for relatively long times. Alternatively, the prepreg fiber bundle is chopped or pelletized and then used in a molding or extrusion process, with or without other polymeric materials or reinforcements, to produce molded or extruded articles.

In the past, a thermoplastic composition has typically been heated, slurried, commingled, or diluted with solvents, plasticizers, or other low molecular weight materials in order to reduce the viscosity of the composition before it is used to impregnate the reinforcing material. These methods have suffered from serious drawbacks. In the case of using solvent to reduce viscosity, the solvent must be driven off after the impregnation step, resulting In an additional step in the process as well as unwanted emissions. Moreover, the desired thermoplastic composition may be insoluble in or Incompatible the desired diluent.

In the case of heating the thermoplastic matrix composition to a temperature at which its viscosity is low enough for satisfactory impregnation of the fiber, the dwell time of the resin in the heated zone may result in degradation of the resin with attendant decrease in the desired mechanical properties. Furthermore, the molecular weight of the resin may need to be kept lower than would be desired for properties of the ultimate product in order to facilitate the impregnation step. Finally, as noted above, known processes for impregnating thermoplastic resin into reinforcing materials have required lengthy consolidation of the prepreg materials at high temperatures and pressures in order to develop the best physical strength and other properties and to minimize or eliminate outgassing during the consolidation or in later steps, e.g., finishing processes. Outgassing during consolidation results in voids within the composite that can cause microcracking or premature delamination that may adversely affect mechanical properties; outgassing during coating steps tends to cause pinholing or popping in the substrate or coating, resulting in an undesirably rough and blemished surfaces or finishes.

Cogswell et al., U.S. Pat. Nos. 5,213,889; 5,019,450; 4,559,262; and 4,549,920 (all of which are incorporated herein by reference), teach that impregnation of fibers with thermoplastic polymers requires (1) a relatively low molecular weight polymer to give sufficiently low melt viscosity (less than 30 $Ns/m^2$; Table 1 showing increasingly poor fiber wetting as the 30 $Ns/m^2$ limit is approached), (2) having within the molten polymer bath a spreader with an external heat input to heat the polymer in the immediate vicinity of the spreader to a relatively high temperature, (3) slow rates of throughput (Table 2 showing significantly decreased fiber wetting at 60 cm/min, as compared to 36 cm/min), and (4) long dwell times of the fibers in the molten polymer bath (dwell time shown in Examples 1 and 5 to be 30 seconds). Conventional grades of thermoplastic material (i.e., having the molecular weights generally using in forming articles from thermoplastic materials) cannot satisfactorily wet out fibers in the Cogswell process, as is shown by patentee's Example 4.

The present invention provides the ability to form prepregs using higher molecular weight polymers in order to achieve the highest possible strength and to optimize other physical properties in articles formed therefrom. In addition, the present inventive process is lower cost and more efficient than previous processes because the present process allows a faster throughput rate and shorter dwell time in the molten polymer bath, while at the same time producing a prepreg in which the fibers are substantially fully wet out.

In another previously known process, Cogswell et al., U.S. Pat. Nos. 4,783,349; 4,735,828; and 4,624,886 (all of which are incorporated herein by reference), use a low molecular weight plasticizer to reduce the melt viscosity of a thermoplastic impregnating resin. The filaments of the fiber bundle are pre-wetted with the plasticizer before entering the molten polymer bath, which may include a further metal plasticizer. The plasticizer is removed by volatilization when it is not desired in the final product. Thus, production of materials with high strength and other physical properties for which plasticization is undesirable requires not only the prewetting step but also a step of evaporating or otherwise extracting the plasticizer following impregnation. The process is also illustrated for fabrics woven of reinforcing fibers, and patentees teach that the process does not require significant mechanical work input in the form of tensioning the fiber. Cogswell et al., in U.S. Pat. No. 4,541,884 (which is incorporated herein by reference), teach a process in which a plasticizer is incorporated in the molten thermoplastic polymer bath to decrease the viscosity of the molten bath. The plasticizer is volatilized from the prepreg in a further process step.

It is undesirable to plasticize the polymer in many applications, for example when higher tensile strength is important. Moreover, the extra steps of impregnating a tow or fiber bundle with a plasticizer and volatilizing or extracting the plasticizer after the impregnation step add expense and make the process cumbersome.

Cochran et al., U.S. Pat. No. 5,236,646 (which is incorporated herein by reference), disclose that a process using vacuum of up to about 28 inches of mercury below atmospheric pressure and temperatures above the melting point of the resin requires a shorter time for consolidation as compared to a process that uses high consolidation pressures of from about 100 to 300 psi. However, the consolidation step still requires a dwell time under vacuum of up to sixty minutes or more.

Because the length of time typically required to properly consolidate the prepreg plies determines the production rate for the part, it would be desirable to achieve the best consolidation in the shortest amount of time. Moreover, lower consolidation pressures or temperatures and shorter consolidation times will result in a less expensive production process due to lowered consumption of energy per piece for molding and other manufacturing benefits.

The present invention provides a new process for preparing prepregs, the novel prepregs produced by such a process, and articles of reinforced materials that offers significant advantages over the processes described above. In a method according the present invention, the reinforcing material is heated before being impregnated with the resinous or polymeric matrix composition. The temperature to which the reinforcing material is heated is significantly higher than the temperature of the resinous matrix composition at which the impregnation takes place. The high temperature of the reinforcing fiber allows the dwell time in the resin bath to be much shorter, and the rate of production of the prepreg material to be much faster, as compared to previously known methods. The impregnated roving or tow that is produced according to the present inventive process has substantially no voids and can therefore be quickly and easily formed into a desired article having no voids or essentially no voids without the lengthy consolidation processes necessary for prepregs formed by other processes. In other words, the roving bundle is fully, or substantially fully, wet out in the prepreg of the invention. The only process that must take place in forming an article is fusion between impregnated bundles, and it is possible to use temperatures, pressures, and/or times during such forming operations that are significantly reduced over prior art processes.

The present invention also provides a method of making a molded article using the prepreg of the present invention.

DETAILED DESCRIPTION

The process of the invention includes heating a fiber or other reinforcing material to a first temperature; bringing the heated reinforcing material into contact with a molten resin composition, during which contact the fiber or reinforcing material is under an applied shear, to form a prepreg; and, optionally, further forming the prepreg into a desired shape. The invention further provides a prepreg having exceptionally few voids or substantially no voids that can be formed into a desired product more quickly and easily than prepregs that are now known in the art. Presence of voids may be determined or measured by measuring the density of the prepreg or article as compared to the density expected for a prepreg in which the fiber is that is completely wet out or by visual observation with the aid of a microscope. The fiber in the prepregs of the invention is thus substantially or completely wet out. By saying that the reinforcing material is "substantially wet out" or that the prepreg has "substantially no voids" I mean that the degree of wetting of the fiber approaches 100%, and preferably is at least about 95%, more preferably at least about 98% and even more preferably at least about 99%. The degree of wetting for the prepregs made according to the invention is usually 100%.

The term "prepreg" as used herein preferably refers to a composite, whether in rod, rope, fiber, roving, strand, tow, sheet, or other form, which comprises a reinforcing fiber or other such substrate impregnated with a resin composition. The present process is especially useful when the resin is a thermoplastic resin, particularly for thermoplastic polymers of higher molecular weights and/or of higher melt viscosities that are desired for forming articles of greater strength and toughness than is available from lower molecular weight polymers. The method of the invention may also be utilized for uncured or partially cured thermoset resins. The present invention is particularly advantageous for thermosetting composition when the viscosity of the composition at the desired processing temperature would otherwise make processing difficult or result in degradation of the resin. For example, the present methods are particularly suitable for so-called "pseudo thermoplastic" materials that exhibit behaviors during prepregging similar to those of true thermoplastic materials. The present inventive processes are also advantageous for heating the reinforcing material to a temperature that will cause partial curing of the thermosetting material when such partial curing is desired before forming the final article. Finally, the invention includes a method of thermoset prepregging for thermosetting compositions having a short "pot life" at the temperature needed to produce a resin viscosity suitable for other prepregging processes. "Pot life" is a term of art that describes the interval of time after mixing during which a thermosetting composition may be used before it sets up (i.e., before the viscosity build up due to crosslinking makes the composition unworkable).

All types of continuous fiber material or other reinforcing materials commonly used for these applications may be used in the processes of the invention. It is also possible for a roving bundle or tow to be shaped before being impregnated, for example to be flattened to a tape. Useful fibers include, without limitation, glass fibers, carbon and graphite fibers, jute, polymeric fibers including aramide fibers, boron filaments, ceramic fibers, metal fibers, asbestos fibers, beryllium fibers, silica fibers, silicon carbide fibers, and so on.

The fibers may be conductive and such conductive fibers, for example conductive carbon fibers or metal fibers, may be used to produce articles for conductive or static charge dissipative applications or EMI shielding. By "continuous fiber material" it is meant a fibrous product in which the fibers or filaments are sufficiently long to give the roving or tow sufficient strength to withstand a tension of at least about 0.25 pounds without breaking, and preferably to be impregnated according to the process of the invention without breaking as frequently as to render the process unworkable. In order to have sufficient strength for the roving or tow to be pulled through the impregnation system without breaking, the majority of the continuous fibers of the bundle should He in substantially the direction in which the fiber is being drawn. In the case of reinforcing materials that may also include randomly oriented fibers, such as certain mats, usually at least about 50% by volume of the filaments should be aligned in the direction of the draw.

Glass fibers, in particular, are available in a number of different kinds, including E-glass, ECR-glass (a modified E-glass that is chemically resistant), R-glass, S-glass and S-2 glass, C-glass, and hollow glass fibers. For many applications glass fibers of higher modulus will be preferred; thus, the order of preference among the glass fibers from more preferred to less preferred is S-2, C, R. then E. Commercially available fibers include Nenxtel™ ceramic fiber (from 3M); Vectran™ (from Hoechst-Celanese); and Hollow-X™ (from Owens-Corning).

The fiber filaments are usually formed into a bundle, called a roving or tow, of a given uniform cross-sectional dimension. The fibers of the bundle are usually all of the same type, although this is not essential to the present method. The fibers are sufficiently long to form a continuous roving or tow with enough integrity to be employed in the present method without a frequency of breaking that would render the method unworkable. The number of filaments in the roving or tow can be varied and a wide range of filaments are included in rovings known in the art. Commercially available glass rovings may include 8000 or more continuous glass filaments. Carbon fiber tapes can contain 6000 or more filaments. Rovings may be formed using different thicknesses of filaments, also, such as, without limitation, filament thickness from about 5 microns to about 30 microns. Standard glass materials available, for example, that can be employed in the method of the invention include, without limitation, 125 yield to 3250 yield bundles. (The yield refers to the yards of glass per pound.) One preferred reinforcing material is a 675 yield glass roving.

For a particular Impregnating matrix composition, a reinforcement should be chosen that can withstanding the temperatures and shear suitable for producing the desired prepreg. In particular, if a fiber is coated with a sizing or finishing material, the material should be one that is stable and remains on the fiber at the selected processing temperature. A sizing or finishing material, if employed, may be selected and applied according to customary means. Unsized fibers such as carbon are advantageously employed in some applications in order to optimize mechanical properties. In one preferred embodiment, fiberglass filaments are impregnated with a thermoplastic resin. Fiberglass filaments typically are coated with a sizing and/or finishing material. The sizing material or finishing material used is selected to be able to withstand the temperatures to which the fiberglass is heated during the process. One preferred sizing is Owens Coming 193/933.

In a preferred method of the invention, a continuous feed of a continuous fibrous reinforcing material is heated and introduced into a molten composition of the matrix polymer or resin material. The apparatus of the invention thus includes a heater for heating the fibrous reinforcing material and a container in which the molten impregnating resin composition is disposed. In a preferred embodiment, the container has an inlet through which the fibrous reinforcing material enters the container and an outlet through which the fibrous reinforcing material exits the container. The heater is located so that it can provide the fibrous reinforcing material to the inlet to the container with the fibrous reinforcing material being at a temperature that is sufficient to produce a prepreg having no voids or substantially no voids. The temperature to which the fibrous reinforcing material is heated is thus sufficient to cause the impregnating resin to fully or substantially fully wet out the fibrous reinforcing material. In particular, the heater is one that is capable of heating the reinforcing material to a temperature above the temperature of the molten matrix resin, and, preferably, the heater is one that is capable of heating the reinforcing material to a temperature of above about 350° F. and up to about 800° F., as measured at the inlet of the container. Preferably, the reinforcing material is heated to at least about 392° F. (200° C.), more preferably at least about 428° F. (220° C.), still more preferably at least about 446° F. (230° C.), yet more preferably at least about 473° F. (245° C.), and temperatures at or above about 500° F. (260° C.) or even at or above about 536° F. (280° C.) may be preferred, depending upon the impregnating polymer.

The fiber material should be a temperature that is sufficiently higher than the temperature of the molten resin or polymer composition so as to provide for a viscosity of the resin or polymer at the interface with the fiber bundle that is sufficiently low to fully wet out the fiber. In a preferred embodiment, the fiber material is heated to a temperature that is at least about 75° F. (42° C.) higher than the temperature of the molten resin composition. Even more preferred are embodiments in which the fiber material is at least about 100° F. (56° C.), even more preferably about 150° F. (83° C.), and more preferably yet about 200° F. (111° C.) hotter than the molten resin composition. It has been found that the fiber material may be up to about 500° F. (278° C.) or more hotter than the molten resin composition in practicing the present invention. It is also preferred for the fiber temperature to be from about 75° F. to about 200° F. above the temperature of the molten polymer bath. "Fiber temperature" in terms of the invention refers to the actual temperature of the fiber after exiting the oven, and not to the temperature of the oven. The actual temperature of the fiber will usually be significantly lower than the temperature of the oven. Thus, the oven may be short and be much hotter than the desired fiber temperature, or may be longer and be closer to the desired fiber temperature. In one preferred embodiment, the oven temperature is from about 100° F. to about 1000° F. hotter than the desired temperature of the fiber, and the length of the oven provides a dwell time of at least about 0.5 second, preferably from about 0.5 to about 10 seconds, more preferably from about 1 second to about 3 seconds.

The fiber bundle, roving, tow, tape, or other reinforcing material is heated to a selected temperature above the melting point, softening point, or glass transition temperature ($T_g$) of the impregnating resin matrix composition. (Which of these—melting point, softening point, or $T_g$—a particular composition has depends upon the particular characteristics of the composition, as whether the composition comprises an amorphous or crystalline impregnating resin, but is not critical to the invention.) The temperature to which the fibrous reinforcing material is heated is sufficient to produce a prepreg having no voids or substantially no voids. The temperature to which the fibrous reinforcing material is heated is thus sufficient to cause the impregnating resin to fully or substantially fully wet out the fibrous reinforcing material. In a preferred embodiment of the invention, the reinforcement is heated to at least about 25° F., preferably to at least about 50° F., still more preferably to at least about 75° F., and even more preferably to at least about 100° F. above the melting point, softening point, or $T_g$ of the resin matrix composition; and up to about 500° F., preferably up to about 400° F., particularly preferably up to about 350° F., and even more preferably up to about 300° F. above the melting point, softening point, or $T_g$ of the resin matrix composition. In a preferred embodiment, the reinforcing material is heated to a temperature above about 350° F., and below about 800° F. Some considerations in the choosing a particular temperature to which to heat the reinforcement will be the distance that it must travel through the resin bath, the speed with which it is pulled through the bath, the viscosity of the resin in the bath, and the shear produced at the surface of the reinforcement. Because the length of time to which the matrix resin composition is exposed to such temperature is relatively short, the roving bundle or tow may be heated even to temperatures that might otherwise cause thermal degradation of the matrix resin composition.

The means for heating the fiber is not generally critical, and may be chosen from any number of means generally available for heating materials. Particular examples of such means include, without limitation, radiant heat, inductive heating, infrared tunnels, or heating in an oven or furnace, e.g. an electric or gas forced air oven. Insufficient heating may result in undesirable resin conglomeration at the surface of the roving bundle, tow, or other reinforcement. Thus, the temperature to which the roving bundle is heated should be sufficient to allow the resin to flow between the filaments or fibers to impregnate the roving or tow in a substantially uniform way. The methods of the invention allow the resin matrix composition to impregnate the fiber bundle instead of agglomerating at the surface of the fiber bundle. The particular temperature chosen will depend upon factors that would be obvious to the person of skill in the art, such as the particular type of resin used, the denier of the fiber, and the profile or size of the bundle and can be optimized by straightforward testing according to the ultimate application method. Preferably, the reinforcing material is heated above the temperature of the impregnating matrix composition. In a preferred embodiment of the present process, fiberglass coated with Owens Corning 193/933 sizing is heated to above about 350° F., and below about 800° F.

The matrix resin compositions used in the methods of the invention may be thermoset or, preferably, thermoplastic resin compositions. Virtually any thermoplastic resin suitable for forming into articles by thermal processes, molding, extrusion, or other such processes may be employed in the methods of the invention. For example, and without limitation, the following thermoplastic materials may advantageously be used: acrylonitrile-butadiene-styrene (ABS) resins; acetal resins; acrylics; acrylonitriles (AN); allyl resins; cellulosics; epoxies; polyarylether ketones; polyether etherketones (PEEK); liquid crystal polymers, such as those sold under the tradename Xydar by Amoco Polymers Inc., Atlanta, Ga.; amino resins, including melamine, melamine formaldehyde resins, urea formaldehyde resins, guanidines, and so on; phenolics; polyamides, such as poly(tetra-methylene) adipamide and polyphthalamide; polyimides; polyamide-imide resins; polyolefins, such as polyethylene, polypropylene, and polybutylene homopolymers and copolymers, including such polymers that are modified with other materials such as maleic anhydride; polycarbonates; polyesters, such as polyalkylene terephthalates including, without limitation, polybutylene terephthalate (PBT) and polyethylene terephthalate (PET); polyimides and polyetherimides; polyphenylene oxide; polyarylene sulfites such as polyphenylene sulfite; polyarylene sulfides such as polyphenylene sulfide; polyvinyl resins, including, without limitation, polystyrene(PS) and copolymers of styrene such as styrene-acrylonitrile copolymer (SAN), polyvinyl chloride (PVC), and polyvinylphenylene chloride; polyurethanes; and polysulfones, including, without limitation, polyaryl-ether sulfones, polyether sulfones, and polyphenyl sulfones. The thermoplastic resins may have melting points, softening points, or $T_g$s ranging up to about 750° F. Mixtures of two or more resins may also be used. Preferred thermoset resin compositions include epoxies that cure with amines, acids, or acid anhydrides and polyesters that cure through unsaturation, as well as bismaleimides, polyimides, and phenolics.

The matrix compositions may include one or more additives, such as impact modifiers, mold release agents, lubricants, thixotropes, antioxidants, UV absorbers, heat stabilizers, flame retardants, pigments, colorants, nonfibrous reinforcements and fillers, impact modifiers such as ionomers or maleated elastomers, and other such customary ingredients and additives. In the case of a thermoset resin composition, a catalyst or initiator for the curing reaction may advantageously be included. The thermoplastic polymer compositions used in the process of the invention preferably do not include plasticizers.

The bath container may be, for example, a tank, a tube, an impregnation die, or any other container of suitable size to accommodate both the resin and the fibrous reinforcing material. In a preferred embodiment, there is a shearing mechanism through which the fiber bundle passes to help wet out the individual filaments. While in the molten polymer bath, the fibrous reinforcing material passes through the shearing mechanism. For example, the container may be a tank having as an inlet a tapered die, an outlet a sizing die, and as a shearing mechanism at least one shear pin, and preferably at least a pair of shear pins. The container may further comprise an opening through which pressure is applied to the molten resin, for example by a piston. In another example, the container may be an impregnation die, having an inlet for a fiber, an inlet for resin, a pair of die shear pins through which the fiber is pulled, and an outlet. The shear pins may have a radius of from about 0.1 inch to about 1 inch, preferably from about 0.2 inch to about 0.5 inch, even more preferably about 0.25 inch. Any of the individual components of the bath apparatus may be heated or may be used to convey heat to the molten resin composition.

In one aspect of the invention, the heated roving bundle is moved through a bath of molten impregnating matrix resin composition, preferably with a shear sufficient to aid in the flow of the resin into the roving bundle. Shear may be created by moving a roving across two displaced and opposing pins located in the matrix resin bath. Shear force may be created by applying tension to the fiber or roving bundle while the fiber or roving bundle is passing over and around these pins. Greater shear may be created by increasing the separation of the pins or by increasing the tension on the creel, for example with the aid of a magnetic brake. The shear pins are preferably displaced horizontally as well as vertically. The displacement in each direction may be at least about 0.2 inch, preferably at least about 0.5 inch. Displacements in either or both directions is preferably from about 0.5 inch to about 3 inches, and more preferably from about 0.75 to about 2 inches. The fibers are pulled through the apparatus of the process (including oven and molten polymer bath) with a tension of at least about one-quarter pound and less than a tension that would cause the tow or roving to break too often to be workable. It is more preferred for the tension to be at least about 2 pounds and no more than about 8 pounds. Tensions of from about 3 pounds to about 5 pounds are particularly preferred. In general, the shear should be increased when the viscosity of the resin increases. In a preferred embodiment, the fibers are heated to a temperature approaching the degradation temperature of the resin. At higher temperatures, the viscosity of the resin that comes into contact with the heated fiber is minimized and, consequently, the shear required to move the fiber through the resin is minimized. In a preferred embodiment the shear pin or pins are heated to a temperature above the temperature of the molten resin composition. Heating the shear pins will heat the resin composition in the immediate vicinity of the shear pins and thereby reduce its viscosity, aiding in impregnation of the fiber material. Heating the shear pins will likewise aid in keeping the heated fiber at a higher temperature, also promoting substantially complete wetting of the fibers. Because of the high temperatures of the fiber material used in the process of the invention, there will usually be no added benefit to including more than one pair of shear pins unless the molten resin composition is exceptionally high in viscosity.

The viscosity of the molten resin composition should be low enough to allow penetration by the fiber material without substantial destruction of the fiber. The viscosity may, however, be quite high, and it is contemplated that the process may be carried out with most thermoplastic materials, even those having high molecular weights. On the other hand, the molten polymer composition may have very low viscosity, for example 2 Pascals or lower. In a preferred embodiment, though, due to the generally better physical properties available with higher molecular weight materials, the viscosity of the molten polymer composition is at least about 125 Pascals, more preferably at least about 150 Pascals, even more preferably at least about 175 Pascals, and still more preferably at least about 200 Pascals. Preferably, the viscosity of the molten resin composition used to impregnate the heated fiber material is from about 10 Pascals to about 250 Pascals, more preferably from about 100 Pascals to about 250 Pascals, and even more preferably from about 125 Pascals to about 250 Pascals. Viscosities of from about 160 Pascals to about 220 Pascals are also preferred.

In another embodiment of the invention, one or more shear pins include an opening such as a hole, slit, or slot through which the molten impregnating resin composition may be exuded. The slot preferably is located so as deliver the molten impregnating resin composition to a point where it will come into contact with the heated fiber material before or during the point where the fiber comes into contact with the shear pin. Thus, it is contemplated that the molten resin composition is delivered from an opening to the nip formed between the fiber material and the shear pin (the leading angle) or at area where the fiber material actually contacts the shear pin.

Once the prepreg exits the bath container, the applied molten resin begins to cool. The dwell time of the fiber in the bath, the time during which the fiber material is contacting the molten resin composition before cooling of the molten resin composition begins, is preferably no more than about 10 seconds. Dwell times of no more than about 5 seconds are more preferred, and no more than about 2 seconds even more preferred. Dwell times of less than 1 second, and even less than half of a second, to attain substantially no voids in the prepreg are entirely possible in the practice of the invention and preferred over longer times. The dwell time is controlled by the length of the bath and the rate at which the fiber is pulled through the bath in the pultrusion process. It is preferred for the fiber material to be impregnated at a rate of at least about 10 feet (305 cm) per minute, more preferably at least about 20 feet (610 cm) per minute, even more preferably at least about 30 feet (914 cm) per minute, and yet more preferably at least about 40 feet (1220 cm) per minute. In a preferred embodiment, the fiber bundle moves at a rate of from about 25 feet (762 cm) per minute to about 60 feet (1829 cm) per minute, more preferably from about 35 feet (1067 cm) per minute to about 55 feet (1676 cm) per minute, and yet more preferably from about 40 feet (1220 cm) per minute to about 55 feet (1676 cm) per minute. Optionally, the apparatus of the invention further includes molding equipment for forming the prepreg into an article of a desired shape.

In one particularly preferred embodiment, a glass roving is impregnated with an acid- or anhydride-modified polyolefinic material, in particular with a maleic anhydride modified polyethylene or polypropylene material. Maleic anhydride modification is advantageous when a stiffer part is desired. In particular, up to about 10%, preferably from about 1% to about 10%, particularly preferably from about 2% to about 7%, of the maleic anhydride modification may be included. Impregnating glass rovings with maleated polyethylene or maleated polypropylene according to the method of the inventions provides materials having unexpectedly improved physical properties. While not wishing to be bound by theory, it is believed that the unexpectedly good properties may be due to crystallinity forming at the glass interface. It is theorized that, due to the fact that the hottest part of the prepreg is the fiber, and hence that the impregnating resin is hottest at the fiber interface, the crystals of a crystallizable polymer are able to form more slowly at the filament interface, creating a stronger adhesion between the polymer and the glass filament. It is further theorized that because the fiber is hotter than the surrounding resin, the maleic anhydride groups could tend to volitize and migrate in higher concentration to the filament surface where they lower viscosity and increase interface wetting, again promoting unexpectedly strong interfacial adhesion between filament and polymer. Other polymers that tend to form crystalline regions or that are modified to enhance adhesion may also be employed.

A further advantage available from having the fiber hotter than the resin composition is that additives have a longer time to interact with the filaments or thermosetting compositions are able to react more fully, particularly at the critical interface with the fiber material. The result is that the process of the invention allows for improved physical properties that were unavailable using previously known processes.

One of the distinguishing aspects of this process is that the fibers, by virtue of their higher temperature, are the last items to cool upon exiting the bath, thereby (a) providing a longer time for the adhesion process, (b) changing how crystallization takes place at the interface, and (c) possibly causing the maleic anhydride to migrate to the interface to lower viscosity and increase wetting. Another advantage of the hot fibers is that it allows use of substantially higher viscosity resins, eg., of greater than 200 pascals.

After the fibers of the roving or tow have cooled to approximately the temperature of the matrix resin bath, the amount of resin adhering to the exterior of the bundle may be increased or decreased in order to achieve a desired ratio of resin to fiber for the impregnated bundle. In particular, the impregnated roving bundle may be fed through a shearing mechanism at a rate that will allow laminar flow of the resin, and then through a sizing die, in order to give the roving or tow its final desired shape and resin percentage.

When a prepreg is formed with a fiber bundle, the sizing die may be used to flatten the impregnated fiber bundle into a tape. The tape may then be woven to form a prepreg mat or cloth. Because the fiber bundle was fully or substantially fully wet out, each of the bundle, the tape, and the cloth or mat made from the tape is drapable. As an added benefit in the case of a glass roving, weaving the roving into a cloth after it has been fully impregnated is preferred to weaving the unimpregnated glass because of the difficulties attendant in handling the raw glass.

While the thermoplastic resin composition is still hot enough to be soft, or while a thermosetting resin composition is not yet fully cured, the prepreg may be further modified by adding an outer layer ("cladding") of a different resin composition. This may be accomplished by pulling the prepreg product through a bed of powdered resin or polymer of the desired composition. A prepreg roving or tow may also be clad with an outer layer of a different polymer composition by a wire coating process. Alternatively the not yet fully cooled or fully cured prepreg may be coated with a second reinforcing material, such as a pulverulent reinforcing material (e.g., a mineral reinforcing material) or chopped or finely chopped fibers. If coated with a second reinforcing material, the prepreg is preferably passed between compaction rollers, preferably heated, to aid in firmly attaching the second reinforcing material to the prepreg. The prepregs coated with a second reinforcing material could be chopped up and used in injection molding. If the prepreg is coated with carbon, it could be used for forming parts that have electrostatic dissipation properties.

The polymer of the cladding may be chosen to lend important properties to the article to be formed from the prepreg material. For example, the cladding may be a higher molecular weight version of the same polymer. As another example, the fiber material can be impregnated with a nylon polymer and then clad with a polyethylene or polypropylene composition. A polycarbonate prepreg can be coated with a polyethylene cladding to provide better chemical resistance. A polyphenyl sulfide could be coated with a nylon polymer composition. A polypropylene prepreg could be coated with polyethylene to combine the better mechanical properties of polypropylene with the toughness of the polyethylene. In many cases, the cladded prepregs are advantageously formed into articles by compression molding to keep the different polymers of the prepreg and the cladding separate.

The roving or tow may then be wound onto creels, chopped into strands of a desired length, for example at least about 3 mm in length, and up to about 76 mm in length, or used immediately in a pultrusion or forming operation. A tape or cloth may also, for example, be wound onto a creel for use in a later forming process.

The apparatus of the invention, in another embodiment, includes a heater for heating the fibrous reinforcing material and a compressing unit for pressing the heated fibrous reinforcing material together with a solid body of a matrix resin composition. The heater is located so that it can provide the fibrous reinforcing material to the compressing unit with the fibrous reinforcing material being at a temperature that is sufficient to produce a prepreg having no voids or substantially no voids. The temperature to which the fibrous reinforcing material is heated is thus sufficient to cause the impregnating resin to fully or substantially fully wet out the fibrous reinforcing material. In particular, the heater is one that is capable of heating the reinforcing material to a temperature above the melting point, softening point, or glass transition temperature of the matrix resin, and preferably a temperature above about 350° F. and up to about 800° F., as measured at the point where the reinforcing material enters the compressing unit.

A mat or sheet may be preheated as described and then compressed with the matrix resin composition into a sheet of laminate. Sheet molding compounds may be produced according to this variation of the present process.

In general, the prepregs of the invention may comprise from at least about 1% by weight resin, and up to about 150% by weight resin, based upon the weight of the fiber. The preferred ranges of the weight of resin included in the prepreg will depend upon the specific resin and reinforcing material used, as well as upon the desired properties and use of the article to be formed by the process. Optimum ratios of resin to fiber may be determined according to known methods. In a preferred embodiment, the resin is at least about 25% by weight, and up to about 75% by weight, based upon the weight of the reinforcing fiber.

The preferred impregnated roving or tow produced according to the inventive methods may be described as a "fully impregnated" roving or tow; that is, the interface between the fibers and the resin is substantially free of voids. An impregnated fiberglass roving, for example, has a set and uniform dimension with a given amount of thermoplastic resin matrix. This impregnated roving can be molded quickly into a finished part having substantially no voids and having excellent properties without the need for a lengthy or rigorous consolidation step. Thermoplastic composite matrices are preferred over thermoset matrices when properties of toughness, capacity for recycling and/or reforming and/or post-forming of the piece, resistance to UV degradation, or other specific properties available in thermoplastic mediums are required.

It is known in the art that the properties developed in the final article are dependent upon the impregnation process and the consolidation and other fabrication steps following impregnation. This is particularly true for high viscosity thermoplastics that are impregnated neat (that is, without including solvent). The prepregs produced according to the methods of the invention have uniform dimensions, homogenous distributions of the impregnated resin, and are preferably essentially free of voids.

The impregnated fibers of the invention may be used as unidirectional, woven (e.g., fabric), or random (chopped) materials. The fibers may be used as unidirectional tows, such as those of 3000, 6000, and 12,000 filaments per tow that are usual in the industry, typically of lengths up to about 1000-m (3000-foot). The fibers may also be formed into unidirectional tapes, such as tapes having the typical dimensions of 150-mm (6-inch) or 300-mm (12-inch) widths and lengths of up to 50 m (150 feet). Tapes typically range from about 80 g/m$^2$ to about 190 g/m$^2$, and a typically 0.125 mm (5 mils) thick. Prepreg unidirectional tow may optionally be woven into a fabric.

The prepreg of the invention is cut or trimmed to a desired shape. Plies can be trimmed from a prepreg roll into the desired shape, size, and orientation by means of any cutting device known in the art. Plies can be stacked by hand or by machine in what is known in the art as a lay-up operation.

The prepreg of the invention may be formed into articles by compression molding, filament winding, vacuum bagging, or combinations of these processes. Compression molding is usually employed for forming complex shapes and is used in a preferred embodiment of the invention.

A stack of assembled plies may be consolidated using heat or a combination of heat with either pressure or vacuum for a period of time sufficient to consolidate the plies. The time of consolidation is preferably from about 1 minute to about 20 minutes at a temperature preferably greater than the melting point, softening point, or Tg of the resin matrix, preferably at least 20° C. above the melting point, softening point, or Tg of the resin, and particularly preferably above about 20° C., and below about 100° C. above the melting point, softening point, or Tg of the resin. Optionally, additional resin may be added to help bind or ply the tows together, particularly in a wire coating process.

The pultruded prepreg may be cut into sections to be formed by extrusion methods. Suitable extruders are single-screw extruders or extruders in which the polymer is driven by a plunger. If the pellets of the inventive prepreg are to be melt blended during extrusion, this may be accomplished using either a single-screw extruder or a static mixer. The excellent fiber wetting in the prepreg prevents substantial fiber damage during the forming processes. Thus, there is usually no significant fiber attrition.

The prepreg may be formed into articles according to any of the methods known in the art. For example, a compression molding or vacuum molding process may be used. Other processes, such as injection molding, thermoforming, blow molding, calendering, casting, extrusion, filament winding, laminating, injection molding, rotational or slush molding, transfer molding, lay-up or contact molding, or stamping may be used with the impregnated materials formed by the present methods.

The methods of the invention may be used to form many different kinds of useful articles. Examples of such articles include, without limitation, air bag canisters, bumper beams, frame cross members, automotive door frames, automotive body panels, high strength brackets, leaf springs, seat frames, skid plates, torsion bars, wiper arms, fencing, gears, highway reinforcing rod, pipe hangers, power line cross arms, boat trailers, canoes, outboard engine cowlings, bow limbs, car top carriers, and horse shoes. The inventive methods and novel prepregs may be advantageously used to form any article that might be formed using previously known prepregs and methods.

The invention is illustrated by the following examples. The examples are merely illustrative and do not in any way limit the scope of the invention as described and claimed. All parts are parts by weight unless otherwise noted.

EXAMPLE 1

Figure 1:
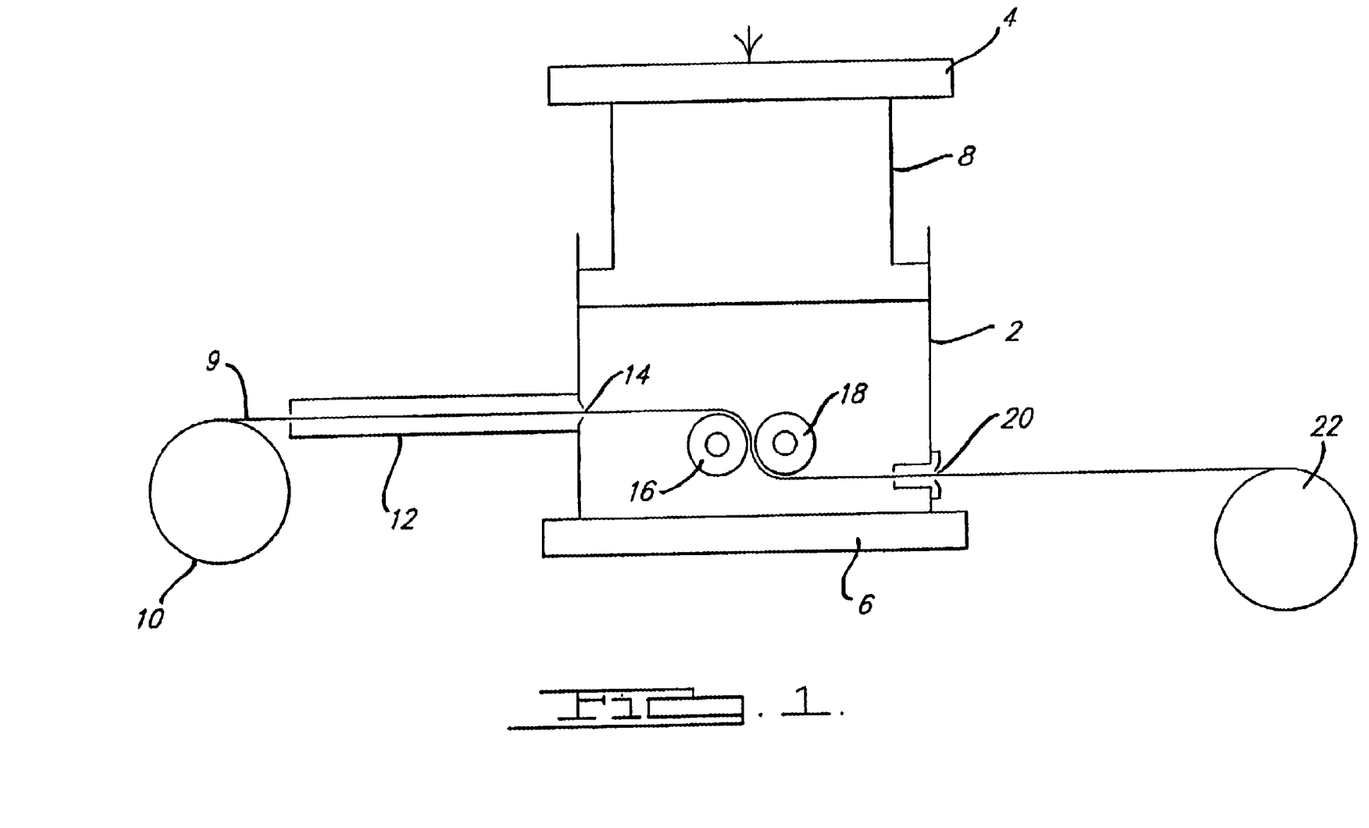
FIG. 1 is a schematic diagram for a preferred apparatus of the invention used in a method of the invention that is demonstrated by Examples 1 and 2.

Referring now to FIG. 1, 1 kg of amorphous nylon resin (Grivory 21, available from EMS-American Grilion Inc., Sumpter, S.C.) Is charged to resin tank 2 between heated platens 4 and 6. The resin is heated to about 465° F. under a pressure of about 28 psi applied from piston 8. A roving of S2 glass (750 yield, 933 sizing, available from Owens Coming, Coming N.Y.) is pulled from a creel 10 and through an 18 inch radiant heat tube 12, the tube being heated to a temperature of about 595° F. Exiting the heat tube, the roving is passed through a tapered fiber inlet die 14, over and around two 0.3 inch radius shear pins 16 and 18 heated to 495° F. and positioned about one inch apart horizontally and about 1.5 inches apart vertically in the resin bath, and finally through a sizing die 20 located opposite the inlet die. The sizing die has a rectangular cross section with a dimensions of 0.25 in.×0.009 in. The hot fiber is pulled at a rate of about 42 ft/min. through the bath. The resulting impregnated tow is 0.25 in. wide, 0.0095 in. thick, and has no measurable air void content. The impregnated tow is wrapped onto a flat 2-bar rotating creel 22. Forty-nine wraps. 2 in. wide, are made on the creel. The wound creel is then place into a pre-heated tool at 480° F. and 200 psi for 8 minutes. The tool is then quenched. The resulting part is 18 inches long, 2 inches wide, and 0.175 inch thick with no measurable void content.

EXAMPLE 2

A tow of S2 glass (750 yield, 933 sizing, available from Owens Coming, Coming N.Y.) is impregnated with amorphous nylon resin (Grivory 21, available from EMS-American Grilion Inc., Sumpter, S.C.) using the same procedure described in Example 1, except that the resulting impregnated tow is sized to 0.25 in. wide and 0.011 in. thick. The impregnated tow has a resin content of 54% by weight. The impregnated tow is chopped into three-inch sections. The chopped impregnated tow, 713.25 grams, is placed into a 10 in.×18 in. tool that is preheated to 515° F. and is pressurized to 300 psi for 8 min. The tool is then quenched. The resulting part weighs 653 grams and has an average thickness of 3.82 mm.

EXAMPLE 3

A woven S2 fiberglass cloth with Owens Coming 933 sizing is impregnated with the same amorphous nylon resin and is used in Examples 1 and 2. The fiberglass cloth has the following parameters: FDI Style #1406 (a designation of Fabric Development Corporation, Quakertown, Pa.); yarn type, S2 glass 75 1/0, 933A; weave, 8 harness satin; count, 120×30; width, 39.25 in.; weight, 11.74 oz per square yard; and thickness, 0.0017 in. as measured at 1 psi.

The nylon is extruded into a film 0.0045 in. thick and placed on a creel. The S2 cloth is also on a creel.

Figure 2:
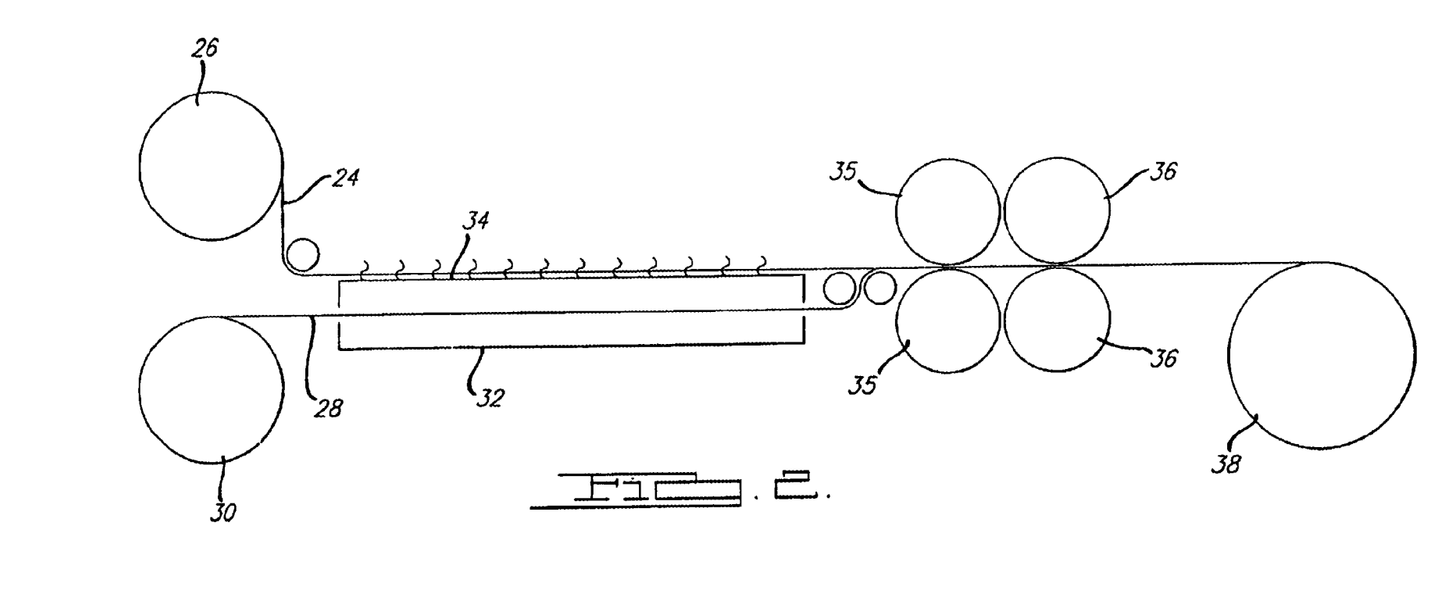
FIG. 2 is a schematic diagram for a preferred apparatus of the invention used in a method of the invention that is demonstrated by Example 3.

Referring now to FIG. 2, the nylon film 24 is pulled from creel 26 and the glass cloth 28 is pulled from creel 30. The glass cloth is pulled through a radiant heater 32. The radiant heater heats the fiber to 600° F., while a reinforced Teflon® sleeve 34 on top of the heater carries the film. Heat escaping from the heater raises the temperature of the film to between 425 and 475° F. The cloth and the film are then fed into two pair of 36-inch compaction rollers 35 and 36. The compaction rollers are covered with Teflon® and two inches of silicone rubber. The rollers exert a force of from 700 to 800 psi on the film and cloth. The impregnated cloth is taken up on creel 38.

The impregnated cloth is cut into sections 10 in.×18 in. Eight plies are then stacked into a preheated (525° F.) tool and compressed at 300 psi for 12 minutes. The tool is then quenched. The resulting laminate is uniform and 0.128 in. thick.

Parts prepared according to the procedures in the above Examples 2 and 3 were tested for physical properties with the following results.

|  | Example 2 | Example 3 |
|---|---|---|
| Tensile Stress (ksi) | 32.81 | 134.8 |
| Young's Modulus for Tensile Stress (Msi) | 2.001 | 6.253 |
| Loss on Ignition (LOI) | 58.752 | 31.894 |
| Glass Content (wt %) | 41.246% | 68.106 |
| Compressive Stress (ksi) | 46.74 | 90.43 |
| Young's Modulus far Compressive Stress (Msi) | 2.088 | 7.271 |

EXAMPLE 4

A polyethylene terephthalate, glycol addition resin (melt temperature=195.8° F., available from Eastman Chemical Co., Kingsport, Tenn.) is impregnated into a warp unidirectional fabric (Style A130A from Knytex). The fabric has a silane chemistry finish with a polyester stitch in the weft direction. The prepregging procedure of Example 3 is followed, except that the fiber is heated only to 425° F. The prepreg is cured Into sheets 10 in.×18 in. Eighteen plies are stacked into a heated mold and compressed at 200 psi for ten minutes. The tool is then quenched and the laminate panel is removed from the tool.

The panel was evaluated using a 3-point flexure test. The mean values for properties measured on five samples were:

| Displacement at Max. Load | 0.1807 in. |
|---|---|
| Maximum Load | 875.7 lb. |
| Stress at Max. Displacement | 112.9 ksi |
| Load Modulus | 5.370 Msi |

EXAMPLE 5

Figure 3:
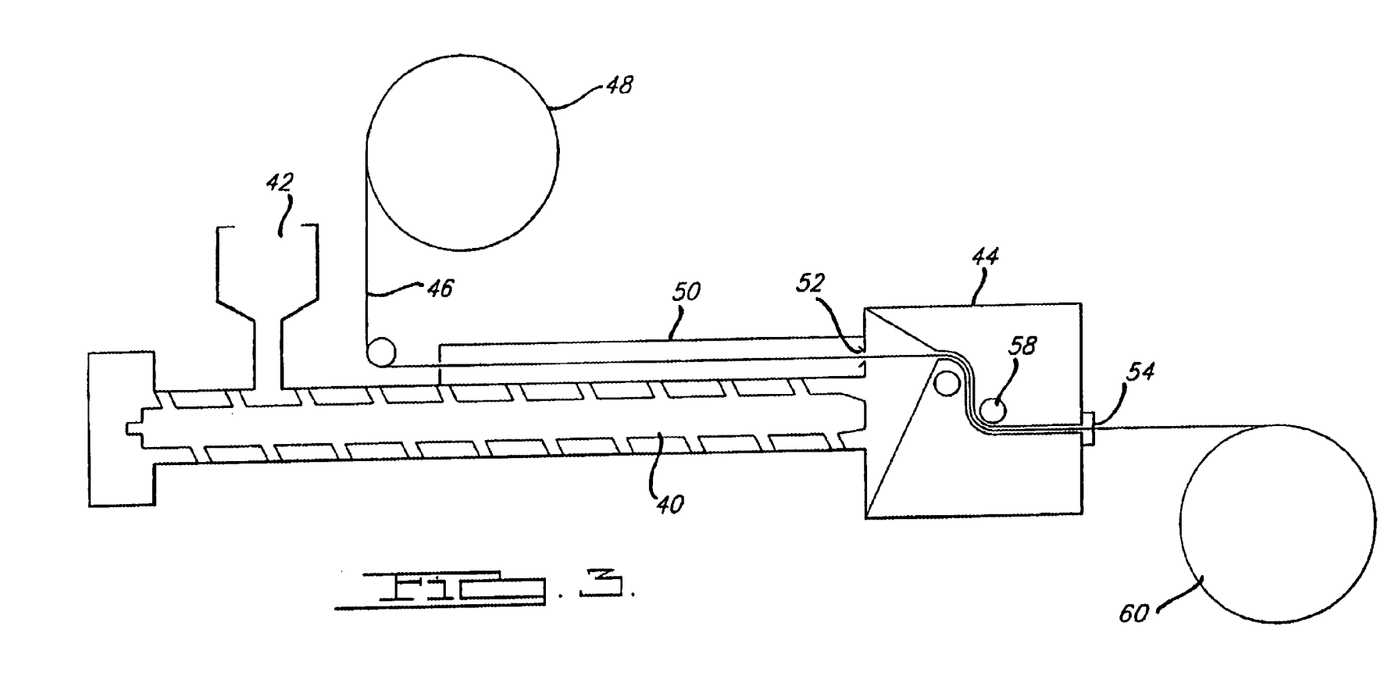
FIG. 3 is a schematic diagram for a preferred apparatus of the invention used in a method of the invention that is demonstrated by Example 4.

Referring now to FIG. 3, an amorphous nylon matrix resin (Grivory 21, available from EMS-American Grilion Inc. Sumpter, S.C.) was fed into extruder 40 from hopper 42. The extruder was a Prodex one-inch extruder having a variable drive. The resin was melted in the extruder in a first zone at 485° F. and a second zone at 500° F., with the extruder turning at a rate of 40 rpm. The molten resin was forced into an impregnation die 44 having three heating zones.

Separately, a tow of S2 glass 46 (750 yield, 933 sizing, available from Owens Coming, Coming N.Y.) is pulled from a creel 48 and through a ThermCraft Tube Furnace 50 (Model 21.5-12-1ZH), the tube being heated to a temperature of about 850° F. Exiting the heat tube, the fiber is threaded through the impregnation die, entering through an inlet die 52 with an opening of 0.25 inch by 0.007 inch and exiting through a sizing die 54 with an opening of 0.25 inch by 0.009 inch.

The impregnation die face was heated to 510° F. and the resin delivery channel 56 was heated to 520° F. Die shear pins 58 in the impregnation die were heated to 535° F. The impregnation die had a surface temperature of 625° F.

The hot fiber was pulled at a rate of about 44 ft/min. through the impregnation die. The resulting impregnated tow was 0.25 inch wide, 0.009 inch thick, had a resin content of 46.78% by weight, and glass content of 53.21 and had no measurable air void content. The impregnated tow was wound onto a frame 60 having a width of 6 inches and a length of 20 inches with 175 wraps. The lay-up was then place into a mold heated to 518° F. and compressed under 200 psi for 10 minutes, then quickly cooled to room temperature. The resulting composite panel had an average thickness of 0.132 inches and no measurable void content. The mechanical properties of the panel were measured with the following results.

| ASTM D695-90 Compressive Properties of Rigid Plastics | |
|---|---|
| Method 7, width 0.5 in., thickness 0.13 in. | |
| Load at Maximum (lbs.) | 4562 |
| Stress at Maximum (ksi) | 70.0 |
| % Strain at Maximum | 2.497% |
| Seg. Mod. 10–40% Maximum Load (psi* $10^6$) | 2.535 |
| Displacement at Maximum (in.) | 0.025 |
| ASTM D638 Tensile Strength | |
| Method 37, width 0.5 in., thickness 0.13 in. | |
| Load at Maximum (lbf) | 3152 |
| Stress at Maximum (psi * $10^3$) | 48 |
| % Strain at Maximum | 0.893% |
| Seg. Mod. 15–40% of Maximum Load (psi * $10^6$) | 4.856 |
| Young's Modulus 15–40% (manually measured) (psi * $10^6$) | 5.128 |
| Young's Modulus 15–40% (automatic) (psi * $10^6$) | 5.753 |
| ASTM D79O Flexural Strength | |
| Method 14, width 0.974 in., thickness 0.145 in. | |
| Load at Yield (Maximum Load) (lb.) | 695 |
| Stress at Yield (Maximum Load) (psi * $10^3$) | 121 |
| Strain at Yield (Maximum Load) (in./in.) | 0.032 |
| Displacement at Yield (Maximum Load) (in.) | 0.21 |
| Seg. Mod. 15–40% of Maximum Load (psi * $10^6$) | 3.897 |
| Young's Modulus 15–40% of Maximum Load (manually measured) (psi * $10^6$) | 4.192 |
| Young's Modulus (automatic) (psi * $10^6$) | 4.015 |
| ASTM D2344 NOL Short Beam Shear Strength | |
| Method 3, span 0.675 in., width 0.26 in., depth 0.143 in. | |
| Load at Yield (Maximum Load) (lb.) | 452 |
| Laminar Shear Strength (psi * $10^3$) | 9.1 |

EXAMPLE 6

A roving of E glass (675 yield, 193 sizing, available from Owens Coming, Coming N.Y.) is pulled from a creel at a rate of 50 feet per minute (1524 cm/min) and with 3 pounds of tension on the roving. The fiber was first pulled through a 17-inch radiant heat tube having an oven temperature of 1050° F. Upon exiting the oven, the glass roving has a measured fiber temperature of about 560° F. The fiber is then pulled through a bath of molten polyethylene (5% maleated) at 435° F. located approximately one inch immediately following the oven. The bath is similar to that of FIG. 1 but is fed by an extruder and does not have a pressurizing piston.

It does have a pair of opposing shear pins. The roving is passed through a tapered fiber inlet die 14, over and around two 0.3 inch radius shear pins 16 and 18 heated to 435° F. and positioned about one inch apart horizontally and about 1.5 inches apart vertically in the resin bath, and finally through a sizing die 20 located opposite the inlet die. The sizing die has a rectangular cross section with a dimensions of 0.25 in.×0.009 in. The molten polymer bath is approximately 4 inches long, providing a dwell time for the fiber in the molten polymer of approximately 0.4 second. The resulting impregnated tow is 0.25 in. wide, 0.0095 in. thick, and has no measurable air void content (confirmed using a scanning electron microscope where there was no observable air void content).

The resulting prepreg was subsequently chopped into one inch lengths and molded at 285° F. under 50 psi for one minute. The test properties (60% HDPE/40% fiber) were:

EXAMPLE 7

The process of Example 6 is repeated using a polypropylene polymer (2.5% maleated).

The prepreg obtained in Example 7 was compared to Verton (Grade: MFX-7008 H8BK881), a glass filled polypropylene prepreg available from LNP.

|  | EXAMPLE 7 | LNP Verton |
|---|---|---|
| % Ash | 42.7 | 39.7 |
| MFR | 1.86 |  |
| Flex. Mod. (kpsi) | 1429 | 1157 |
| Flex. Strength (kpsi) | 27.8 | 20.6 |
| Tensile Mod. (kpsi) | 1700 | 1412 |
| Tensile Strength (kpsi) | 20.21 | 14.42 |
| Break Elong. (%) | 2.2 | 1.8 |
| HDT @ 264 psi ° F. (° C.) | 320(160.3) | 308(153.5) |

| Tensile Properties of Plastics | Stress (psi*10^3) | | | Modulus (psi*10^6) | | |
|---|---|---|---|---|---|---|
| Method: ASTM 638 | Average | Std. Dev. | 95% C.I. | Average | Std. Dev. | 95% C.I. |
|  | 6.623 | 1.579 | 1.960 | 1.151 | 0.705 | 0.876 |

| Flexural Properties | Stress (psi*10^3) | | | Youngs Modulus (psi*10^6) | | |
|---|---|---|---|---|---|---|
| Method: ASTM D 790 | Average | Std. Dev. | 95% C.I. | Average | Std. Dev. | 95% C.I. |
|  | 17.497 | 2.121 | 2.633 | 0.768 | 0.138 | 0.171 |

| Compression Properties | Stress (psi*10^3) | | | Segment Modulus (psi*10^6) | | |
|---|---|---|---|---|---|---|
| Method: ASTM D 695 | Average | Std. Dev. | 95% C.I. | Average | Std. Dev. | 95% C.I. |
|  | 9.124 | 2.520 | 3.128 | 0.701 | 0.189 | 0.235 |

| Unnotched Izod Impact | ENERGY FT-LBS (J/M) | | |
|---|---|---|---|
| Method: ASTM D 4812 | Average | Std. Dev. | 95% C.I. |
|  | 29.06 (1551.78) | 6.68 (356.66) | 0.72 (38.19) |

| Unnotched Izod Impact | ENERGY FT-LBS (L/M) | | |
|---|---|---|---|
| Method: ASTM D 265 | Average | Std. Dev. | 95% C.I. |
|  | 29.38 (1568.73) | 7.75 (413.80) | 0.72 (38.19) |

| Drop Dart Impact Method: ASTM D 5628 Sample Thickness 0.130* | Foot LBS | Number Of Failures | Number Of Passes | Fail or Pass |
|---|---|---|---|---|
|  | 3 | 1 | 3 | Pass |
|  | 6 | 2 | 3 | Pass |
|  | 6.5 | 1 | 3 | Pass |
|  | 7 | 3 | 2 | Fail |
|  | 8 | 3 | 0 | Fail |

| Loss of Ignition | NO of Specs | Ignition Loss % | Glass Content % |
|---|---|---|---|
|  | 3 | 64/1 | 35.9 |

-continued

|  | EXAMPLE 7 | LNP Verton |
|---|---|---|
| Notched izod (ft-lb/in) | 3.48 | 2.75 |
| Break Type % | P/100% | C/100% |

The invention has been described in detail with reference to preferred embodiments thereof. It should be understood, however, that variations and modifications can be made within the spirit and scope of the invention and of the following claims.

What is claimed is:

1. A prepreg material formed by a step of impregnating a fibrous reinforcement at a first temperature with a molten thermoplastic resin composition, wherein the temperature of the molten resin composition is at least about 75° C. (42° C.) lower than the first temperature, and further wherein said prepreg material has substantially no voids, comprising from about 25 to about 75% by weight resin.

2. A prepreg material formed by a step of impregnating a fibrous reinforcement at a first temperature with a molten thermoplastic resin composition, wherein the temperature of the molten resin composition is at least about 75° C. (42° C.) lower than the first temperature, and further wherein said prepreg material has substantially, no void wherein the fibrous reinforcement is coated with a sizing or finishing material.

3. An apparatus for impregnating a continuous fiber material, comprising a heater for heating a fibrous reinforcing material, a means for applying a tension to the fibrous reinforcing material, and a container containing a molten resin composition, said container having an inlet and an outlet for the heated fibrous reinforcing material in which the heated reinforcing material is contacted with the molten resin composition; wherein the container includes therein a shearing mechanism for the fibrous reinforcing material, and further wherein the heater is located so that it provides the heated fibrous reinforcing material to the inlet with the fibrous reinforcing material at a temperature sufficient to cause the molten resin composition to fully or substantially fully wet out the fibrous reinforcing material.

4. An apparatus according to claim 3, wherein the shearing mechanism comprises at least one shear pin.

5. An apparatus according to claim 3, wherein the shearing mechanism comprises from one to about four shear pins.

6. An apparatus according to claim 3, wherein the shearing mechanism comprises a pair of shear pins.

7. An apparatus according to claim 4, wherein at least one shear pin has an opening to provide the molten resin composition.

8. An apparatus according to claim 4, wherein at least one shear pin is connected to a heat source for heating the shear pin.

9. An apparatus according to claim 3, wherein said container further comprises a unit for applying pressure to the resin composition.

10. An apparatus according to claim 3, wherein said outlet is a sizing die.

11. An apparatus according to claim 3, further including molding equipment for forming impregnated fibrous reinforcing material exiting the container into an article of a desired shape.

12. An apparatus according to claim 3, wherein the heater is selected from the group consisting of radiant heaters, inductive heaters, infrared tunnels, ovens, and combinations thereof.

13. An apparatus for preparing a reinforced matrix resin composition, comprising a heater for heating a fibrous reinforcing material, a molten resin composition that is located so as to first contact the heated fibrous reinforcing material while the heated fibrous reinforcing material is at a first temperature, and a compressing unit for pressing the heated fibrous reinforcing material together with the resin composition; wherein the first temperature is sufficiently above the temperature of the resin composition to cause the resin composition to fully or substantially fully wet out the fibrous reinforcing material.

14. An apparatus according to claim 13, wherein the compressing unit is at least one pair of compaction rollers.

15. An apparatus according to claim 13, wherein said first temperature is from about 75° F. to about 500° F. above the temperature of the resin composition.

16. An apparatus according to claim 13, further comprising a sizing die located after said compressing unit.

17. An apparatus according to claim 13, further including molding equipment for forming the reinforced matrix resin composition into an article of a desired shape.

18. An apparatus according to claim 13, wherein the heater is selected from the group consisting of radiant heaters, inductive heaters, infrared tunnels, ovens, and combinations thereof.

19. An apparatus for preparing a prepreg, comprising a heater for heating a fibrous reinforcing material to a first temperature and a container of a liquid, crystallizable resin composition having an Inlet and an outlet for the heated fibrous reinforcing material; wherein the heater is at a temperature and location so that the first temperature, as measured at the point where the heated fibrous reinforcing material is brought into contact with the resin composition, is sufficiently high to cause crystallization at the interface of said reinforcing material and said resin composition of the prepreg.

20. An apparatus according to claim 19, wherein said resin composition has a viscosity greater than 200 pascals.

21. An apparatus according to claim 19 wherein said crystallization is enhanced by the presence of a maleic anhydride group.

* * * * *

UNITED STATES PATENT AND TRADEMARK OFFICE
CERTIFICATE OF CORRECTION

PATENT NO. : 6,709,995 B1
DATED : March 23, 2004
INVENTOR(S) : Joel A. Dyksterhouse It is certified that error appears in the above-identified patent and that said Letters Patent is hereby corrected as shown below:

Column 1,
Line 53, "yams" should be -- yarns --.
Line 55, "vacuums" should be -- vacuum-bag --.

Column 2,
Line 3, (first occurrence), "In" should be -- in --.
Line 6, "Incompatible" should be -- incompatible --.
Line 6, after "incompatible" insert -- with --.
Line 43, "using" should be -- used --.

Column 5,
Line 14, "He" should be -- lie --.
Line 25, "R." should be -- R, --.
Line 49, "Impregnating" should be -- impregnating --.
Line 50, "withstanding" should be -- withstand --.
Line 65, "Coming" should be -- Corning --.

Column 7,
Line 17, after "in" delete -- the --.
Line 50, "Coming" should be -- Corning --.

Column 9,
Line 56, after "as" insert -- to --.

Column 10,
Line 67, "pascals" should be -- Pascals --.

Column 13,
Line 65, "Is" should be -- is --.

UNITED STATES PATENT AND TRADEMARK OFFICE
CERTIFICATE OF CORRECTION

PATENT NO. : 6,709,995 B1
DATED : March 23, 2004
INVENTOR(S) : Joel A. Dyksterhouse It is certified that error appears in the above-identified patent and that said Letters Patent is hereby corrected as shown below:

Column 14,
Line 2, "Corming, Coming" should be -- Corning, Corning --.
Line 10, "dimensions" should be -- dimension --.
Line 16, "wraps." should be -- wraps, --.
Line 17, "place" should be -- placed --.
Line 26, "Coming, Coming" should be -- Corning, Corning --.
Line 41, "Coming" should be -- Corning --.

Column 15,
Line 33, "Into" should be -- into --.
Line 59, "Coming, Coming" should be -- Coming, Comning --.

Column 16,
Line 13, "place" should be -- placed --.
Line 57, "Coming, Coming" should be -- Corning, Corning --.

Column 17,
Line 7, "dimensions" should be -- dimension --.
Table, Line 3, (first occurrence), "95% C.I." .should be -- 95% C.L. --.
Table, Line 3, (second occurrence), "95% C.I." should be -- 95% C.L. --.
Table, Line 8, (first occurrence), "95% C.I." should be -- 95% C.L. --.
Table, Line 8, (second occurrence), "95% C.I." should be -- 95% C.L. --.
Table, Line 13, (first occurrence), "95% C.I." .should be -- 95% C.L. --.
Table, Line 13, (second occurrence), "95% C.I." should be -- 95% C.L. --.
Table, Line 16, "95% C.I." should be -- 95% C.L. --.
Table, Line 20, "95% C.I." should be -- 95% C.L. --.
Table, Line 25, "0.130"" should be -- 0.130" --.
Table, Line 33, "64/1" should be -- 64.1 --.

Column 19,
Line 26, "substantially," should be -- substantially --.
Line 26, "void" should be -- voids --.

UNITED STATES PATENT AND TRADEMARK OFFICE
CERTIFICATE OF CORRECTION

PATENT NO. : 6,709,995 B1
DATED : March 23, 2004
INVENTOR(S) : Joel A. Dyksterhouse It is certified that error appears in the above-identified patent and that said Letters Patent is hereby corrected as shown below:

Column 20,
Line 41, "Inlet" should be -- inlet --.
Line 51, "pascals" should be -- Pascals --.

Signed and Sealed this

Thirty-first Day of May, 2005

JON W. DUDAS
*Director of the United States Patent and Trademark Office*